(12) United States Patent
Okabayashi et al.

(10) Patent No.: US 7,555,610 B2
(45) Date of Patent: Jun. 30, 2009

(54) CACHE MEMORY AND CONTROL METHOD THEREOF

(75) Inventors: Hazuki Okabayashi, Osaka (JP); Ryuta Nakanishi, Kyoto (JP); Tetsuya Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 148 days.

(21) Appl. No.: 10/578,299

(22) PCT Filed: Nov. 2, 2004

(86) PCT No.: PCT/JP2004/016264

§ 371 (c)(1),
(2), (4) Date: May 4, 2006

(87) PCT Pub. No.: WO2005/050454

PCT Pub. Date: Jun. 2, 2005

(65) Prior Publication Data

US 2007/0083718 A1  Apr. 12, 2007

(30) Foreign Application Priority Data

Nov. 18, 2003 (JP) .............................. 2003-387350

(51) Int. Cl.
*G06F 13/00* (2006.01)
(52) U.S. Cl. .................. 711/143; 711/142; 711/133; 711/134; 711/135; 711/136
(58) Field of Classification Search .................. 711/143, 711/142, 133, 134, 135, 136
See application file for complete search history.

(56) References Cited

U.S. PATENT DOCUMENTS 5,754,888 A   5/1998   Yang et al.
5,802,572 A   9/1998   Patel et al.
6,092,159 A   7/2000   Ekner et al.
6,546,467 B2  4/2003   Farrall et al.
2002/0046326 A1  4/2002   Devereux

FOREIGN PATENT DOCUMENTS

| EP | 0863464 | 9/1997 |
| JP | 61-016348 | 1/1986 |
| JP | 6-309231 | 11/1994 |
| JP | 8-069417 | 2/1996 |

(Continued)

OTHER PUBLICATIONS

English Language Abstract of JP 61-016348.

(Continued)

*Primary Examiner*—Hyung S Sough
*Assistant Examiner*—Mardochee Chery
(74) *Attorney, Agent, or Firm*—Greenblum & Bernstein, P.L.C.

(57) ABSTRACT

The cache memory in the present invention includes a C flag setting unit 40 which adds, to each cache entry holding line data, a cleaning flag C indicating whether or not a write operation will be performed hereafter, and a cleaning unit 39 which writes back, to the memory, line data of a cache entry that has been added with a cleaning flag C indicating that a write operation will not be performed, and has been set with a dirty flag D indicating that the cache entry has been written into.

8 Claims, 18 Drawing Sheets

FOREIGN PATENT DOCUMENTS

| | | |
|---|---|---|
| JP | 9-259036 | 10/1997 |
| JP | 10-293720 | 11/1998 |
| JP | 2001-005725 | 1/2001 |
| JP | 2003-223360 | 8/2003 |
| WO | 97/26600 | 7/1997 |

OTHER PUBLICATIONS

English Language Abstract of JP 2001-005725.
English Language Abstract of JP 6-309231.
English Language Abstract of JP 9-259036.
English language Abstract of JP 10-293720.
English language Abstract of JP 2003-223360.
English language Abstract of JP 8-069417.
U.S. Appl. No. 10/571,531 to Tanaka et al., which was filed on Mar. 10, 2006.
U.S. Appl. No. 10/577,133 to Okabayashi et al., which was filed on Apr. 25, 2006.
U.S. Appl. No. 10/578,314 to Tanaka et al., which was filed on May 4, 2006.

CACHE MEMORY AND CONTROL METHOD THEREOF

TECHNICAL FIELD

The present invention relates to a cache memory and a control method thereof, for facilitating high-speed memory access from a processor.

BACKGROUND ART

In recent years, the cache memory has been widely used in order to reduce access time to the main memory and improve the processing performance of the processor.

When data is written into the cache memory from the processor, there is a need to write back from the cache memory to the main memory in order to maintain the consistency of data between the main memory and the cache memory. As a control method for such write back, there exists the write-through method and the write-back method.

In the write-through method, the write operation is performed on both the cache memory and the main memory during the execution of a write instruction from the processor to the cache memory. Since, with the write-through method, a write back penalty occurs every time data is written into the cache memory, the effect on the reduction of memory access time, with respect to the memory write operation, is insignificant.

On the other hand, in the write-back method, the write operation is performed only on the cache memory during the execution of a write instruction, and a write back is performed, from the cache memory to the main memory, just before a dirty line resulting from a cache miss is replaced with new different data. Although, in such write-back method, a write penalty does not occur with every memory write operation, penalties during a cache miss increase as a write back penalty occurs in addition to the load penalty during a cache miss in memory write and memory read operations. Here, load penalty refers to the penalty brought about by the loading of new data from the main memory to the cache memory. Write-back penalty refers to the penalty brought about by writing back data from the cache memory to the main memory.

Conventional technology for reducing such cache miss penalties are disclosed, for example, in patent reference 1 and the like.

According to such conventional technology, in the cache memory in the write-back method, aside from the normal write back operation to the main memory for evicting data from the cache memory, a write back operation which is only for writing back data from the cache memory to the main memory is performed. In the latter operation, first, it is judged whether or not the data of one entry of the cache memory is dirty, and when it is dirty, the data is written back to the main memory. Subsequently, it is verified that the write back concludes normally, and that the data in the cache memory is not changed, and the cache status is assumed to be clean.

In this manner, the cache memory in the conventional technology reduces traffic from the cache memory to the main memory, and improves the performance of the whole system.

Patent Reference 1: Japanese Laid-Open Patent Application No. 6-309231 Publication

DISCLOSURE OF INVENTION

Problems that Invention is to Solve

However, with the aforementioned conventional technology, there is the problem that even when the data of a dirty entry is written back to the memory before a cache miss occurs, efficiency deteriorates instead in the case where data is written into such entry after the write back.

In view of the aforementioned problem, the present invention has as an object to provide a cache memory which efficiently reduces write back penalties during a cache miss.

Means to Solve the Problems

In order to achieve the aforementioned object, the cache memory in the present invention is a cache memory including: an addition unit which adds, to each cache entry holding line data, a caching termination attribute indicating whether or not caching of the cache entry is allowed to be terminated; a selection unit which selects a cache entry that has been added with a caching termination attribute indicating that caching is allowed to be terminated, and has been set with a dirty flag indicating that the cache entry has been written into; and a write back unit which writes back, to a memory, line data of the selected cache entry, regardless of an occurrence of a cache miss.

According to this structure, a write back is performed on a cache entry for which caching is allowed to be terminated, before the occurrence of a cache miss. Therefore, during a cache miss, only a load penalty occurs and the occurrence of a write back penalty can be reduced. With this, it is possible to improve the efficiency of the cache memory and improve access speed.

Here, it is possible to have a structure in which said adding unit includes: a holding unit which holds an address range specified by a processor; a search unit which searches for a cache entry holding line data within the address range held in said holding unit; and a setting unit which sets, to the searched-out cache entry, the caching termination attribute indicating that caching is allowed to be terminated.

Here, it is possible to have a structure in which said search unit includes: a first conversion unit which, in the case where a start address of the address range held in said holding unit indicates a point midway through line data, converts the start address into a start line address indicating a start line included in the address range; a second conversion unit which, in the case where an end address of the address range held in said holding unit indicates a point midway through line data, converts the end address into an end line address indicating an end line included in the address range; and a judgment unit which judges whether or not there exist cache entries holding data corresponding to respective line addresses from the start line address to the end line address.

According to this structure, the processor can specify arbitrary addresses, as the address range in which to set the caching termination attribute indicating that caching is allowed to be terminated, regardless of the line size and line boundaries of the cache memory. Stated differently, as the need for a programmer and compiler to be conscious of the line size and line boundaries is eliminated, line address management for the write back operation need not be performed, and program creation can be made easier.

Here, it is possible to have a structure in which the cache memory further includes a replacement unit which, when a cache miss occurs, selects, as a subject for replacement, the cache entry that has been added with the caching termination attribute indicating that caching is allowed to be terminated.

According to this structure, by setting a caching termination attribute indicating that caching is allowed to be terminated, to a cache entry holding seldom accessed data, such cache entry is the very first to be replaced, and therefore, the inducement of a cache miss due to seldom accessed data being left behind in the cache memory can be reduced.

Here, it is possible to have a structure in which said addition unit includes: an instruction detection unit which detects execution, by a processor, of a store instruction having, as instruction details, addition of the caching termination attribute indicating that caching is allowed to be terminated, and writing of data; and a setting unit which sets the caching termination attribute to a cache entry that has been written into in accordance with the detected instruction.

According to this structure, using the store instruction which instructs the adding of a caching termination attribute and the writing of data, it is possible to easily set a caching termination indicating that caching is allowed to be terminated.

Here, it is possible to have a structure in which said write back unit writes back data of a cache entry to the memory, when a memory bus has an idle cycle.

According to this structure, it is possible to perform an efficient right back which makes use of idle cycles.

Here, it is possible to have a structure in which each cache entry has a dirty flag for each of a plurality of sub-lines making up one line, and said write back unit writes back, to the memory, only a dirty sub-line of the cache entry selected by said selection unit.

According to this structure, since only a dirty sub-line is written back, the write back operation can be performed efficiently.

Furthermore, the cache memory controlling method in the present invention also has the same means and functions as those mentioned above.

Effects of the Invention

As described above, according to the cache memory in the present invention, it is possible to add, to a cache entry which is hereafter not likely to be written into, a caching termination attribute indicating that caching is allowed to be terminated, and write back such cache entry, regardless of the occurrence of a cache miss, in other words, before a cache miss occurs. As a result, during a cache miss, only a load penalty occurs, and the occurrence of a write back penalty can be reduced. With this, it is possible to improve cache memory efficiency and improve access speed.

The processor does not need to perform line address management for the write back operation, and can specify an arbitrary address range regardless of the line size and line boundaries of the cache memory.

NUMERICAL REFERENCES

Figure 1:
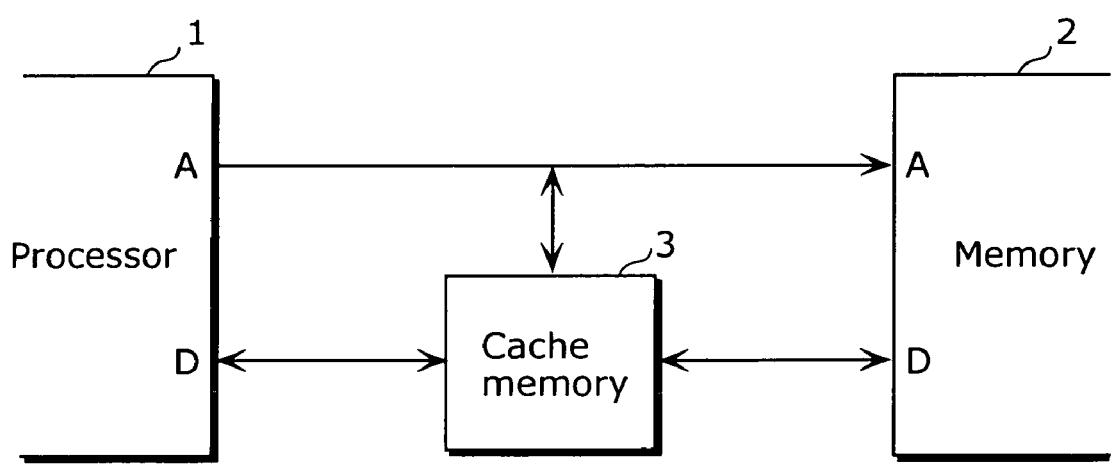
FIG. 1 is a block diagram showing the outline structure of the system including the processor, cache memory, and memory, in the first embodiment of the present invention.

1 Processor
2 Memory
3 Cache memory
20 Address register
21 Memory I/F
30 Decoder
31a to 31d Ways
32a to 32d AND circuits
34 OR circuit
35 Selector
36 Selector
37 Demultiplexor
38 Control unit
39 Cleaning unit
40 C flag setting unit
41 Replacement unit
131b to 131d Ways
138 Control unit
139 Cleaning unit
140 W flag setting unit
401 Command register
402 Start address register
403 Size register
404 Adding unit
405 Start aligner
406 End aligner 406
407 Flag rewriting unit

BEST MODE FOR CARRYING OUT THE INVENTION

First Embodiment

<Overall Structure>

FIG. 1 is a block diagram showing the outline structure of a system including a processor 1, a cache memory 3, and a memory 2 in the first embodiment of the present invention. As shown in the diagram, the cache memory 3 in the present invention is included in a system having the processor 1 and the memory 2.

The cache memory 3 holds, for each cache entry which holds cache-unit data (called line data), a caching termination attribute indicating whether or not caching of the cache entry is allowed to be terminated; selects, regardless of whether or not a cache miss occurs, a cache entry having a caching termination attribute indicating that caching is allowed to be terminated, and which is set with a dirty flag indicating that it has been written into by the processor; and writes back, to the memory, data of such selected cache entry. Here, the caching termination attribute indicating that caching is allowed to be terminated is added to a cache entry which is hereafter not likely to be written into, a cache entry which is hereafter not likely to be read/written into, and the like.

<Structure of the Cache Memory>

Hereinafter, the structure in the case where the present invention is applied to a 4-way set-associative cache memory shall be described as a specific example of the cache memory 3.

Figure 2:
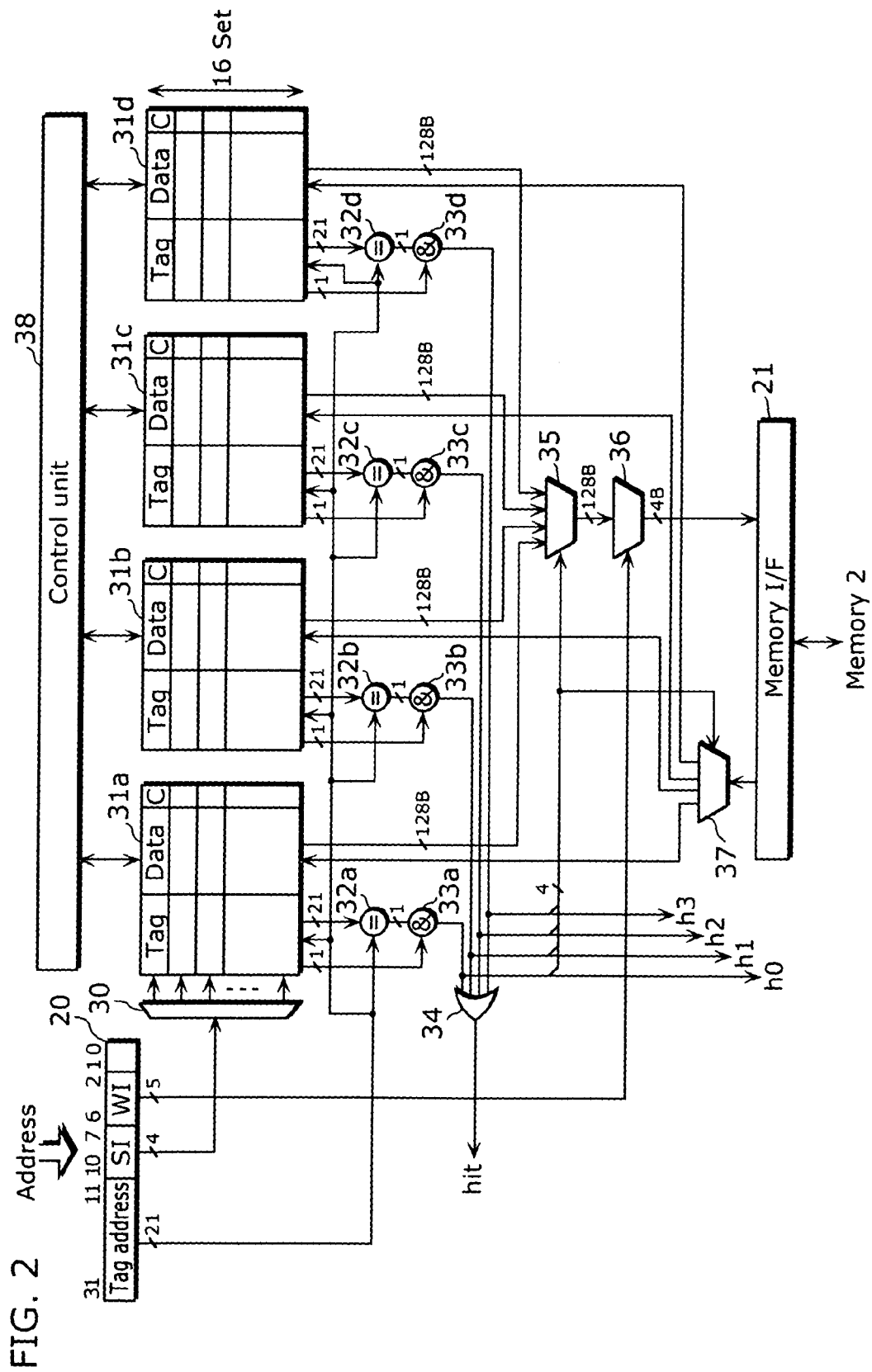
FIG. 2 is a block diagram showing an example of the structure of the cache memory.

FIG. 2 is a block diagram showing an example of the structure of the cache memory 3. As in the diagram, the cache memory 3 includes an address register 20, a memory I/F 21, a decoder 30, four ways 31a to 31d (hereinafter abbreviated as ways 0 to 3), four comparators 32a to 32d, four AND circuits 33a to 33d, an OR circuit 34, selectors 35 and 36, a demultiplexor 37, and a control unit 38.

The address register 20 is a register which holds an access address to the memory 2. Such access address is assumed to be of 32 bits. As shown in the same diagram, the access address includes, in order from the highest bit, a 21-bit tag address, a 4-bit set index (SI in the diagram), and a 5-bit word index (WI in the diagram). Here, the tag address indicates an area (with size being, the number of sets multiplied by a block) within the memory which is mapped by a way. The size of this area is the size defined by address bits (A10 to A0) which are lower than the tag address, in other words, 2 k bytes, and is also the size of one way. The set index (SI) indicates one of a plurality of sets which straddle the ways 0 to 3. As the set index is 4 bits, the number of sets is sixteen sets. A cache entry which is identified by the tag address and the set index is the unit for replacement, and is referred to as line data or a line when stored in the cache memory. The size of line data is the size defined by the address bits lower than the set index, in other words, 128 bytes. With one word being 4 bytes, one line data is 32 bytes. The word index (WI) indicates one word within plural words making up the line data. The lowest 2 bits (A1, A0) within the address register 20 are disregarded during word accessing.

The memory I/F 21 is an I/F for accessing the memory 2 from the cache memory 3 such as in writing back data from the cache memory 3 to the memory 2, and loading data from the memory 2 to the cache memory 3.

The decoder 30 decodes the 4 bits of the set index, and selects one set among the sixteen sets spanning the four ways 0 to 3.

The four ways 0 to 3 are four ways having the same structure and a capacity of 4×2 k bytes. Each way includes sixteen cache entries.

Figure 3:
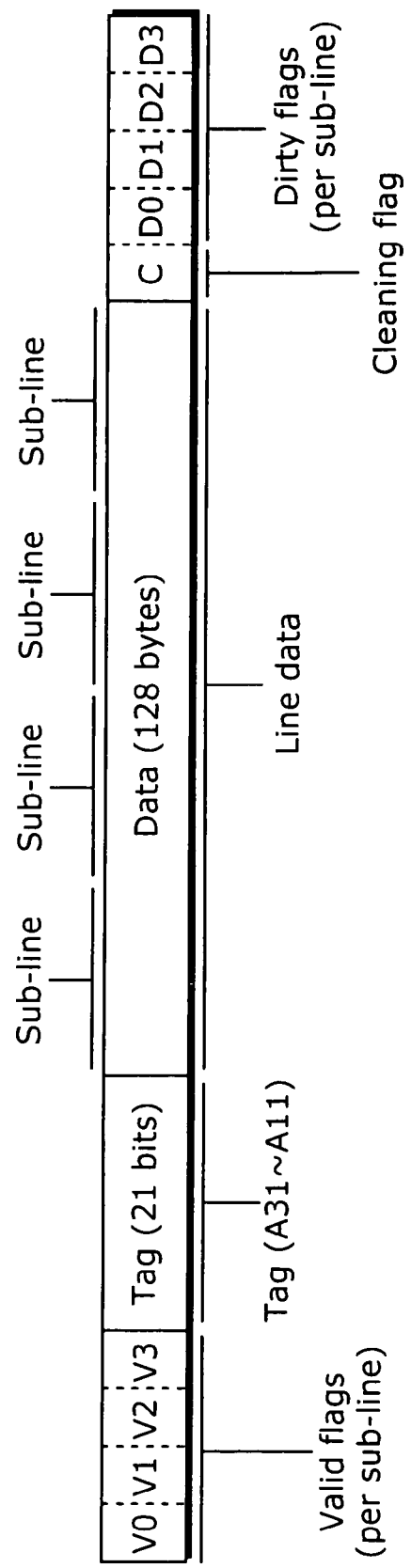
FIG. 3 is a diagram showing the detailed bit structure of a cache entry.

FIG. 3 shows the detailed bit structure of a single cache entry. As in the diagram, a cache entry has valid flags V0 to V3, a 21-bit tag, a 128-byte line data, a caching termination attribute (C flag, in the diagram), and dirty flags D0 to D3.

The tag is a copy of a 21-bit tag address.

The line data is a copy of 128-byte data within a block identified by the tag address and the set index, and is made up of four 32-byte sub-lines.

The valid flags V0 to V3 correspond to the four sub-lines, and indicates whether or not a respective sub-line is valid.

The caching termination attribute (cleaning flag C) indicates whether or not caching is allowed to be terminated. It represents, for example, whether or not writing will be performed hereafter on the cache entry. C=0 means that there is a possibility that writing will be performed hereafter. C=1 means that writing will not be performed hereafter, and means that, when such cache entry is dirty, cleaning (write back) should be carried out.

The dirty flags D0 to D3 correspond to the four sub-lines, and indicate whether or not a respective sub-line has been written into by the processor, in other words, whether or not a write back is necessary as, although cached data exists within a sub-line, such data is different from the data within the memory as a result of the write operation.

The comparator 32a compares whether or not the tag address within the address register 20 matches the tag of the way 0 among the four tags included in the set selected according to the set index. Aside from corresponding to the ways 31b to 31d respectively, everything else is the same for the comparators 32b to 32d.

The AND circuit 33a compares whether or not the valid flag matches the comparison result from the comparator 32a. The result of this comparison shall be assumed to be h0. In the case where the comparison result h0 is 1, this means that there exists line data corresponding to the tag address within the address register 20 and the set index, in other words, a hit has occurred in the way 0. In the case where the comparison result h0 is 0, this means that a mishit has occurred. Aside from corresponding to the ways 31b to 31d respectively, everything else is the same for the AND circuits 33b to 33d. Respective comparison results h1 to h3 represent a hit or miss occurring in the ways 1 to 3.

The OR circuit 34 carries out the OR for the comparison results h0 to h3. The result of this OR is assumed as a hit. A hit indicates whether or not a hit occurs in the cache memory.

The selector 35 selects, among the line data of the ways 0 to 3 in the selected set, the line data of the way in which a hit occurs.

The selector 36 selects, from within the 32-word line data selected by the selector 35, one word which is indicated by the word index.

The demultiplexor 37 outputs write data to one of the ways 0 to 3, during the writing of data into the cache entry. The write data may be in 1-word units.

The control unit 38 performs the overall control of the cache memory. In particular, it performs the setting of a C flag and the cleaning (write back) in accordance with such C flag.

<Structure of the Control Unit>

Figure 4:
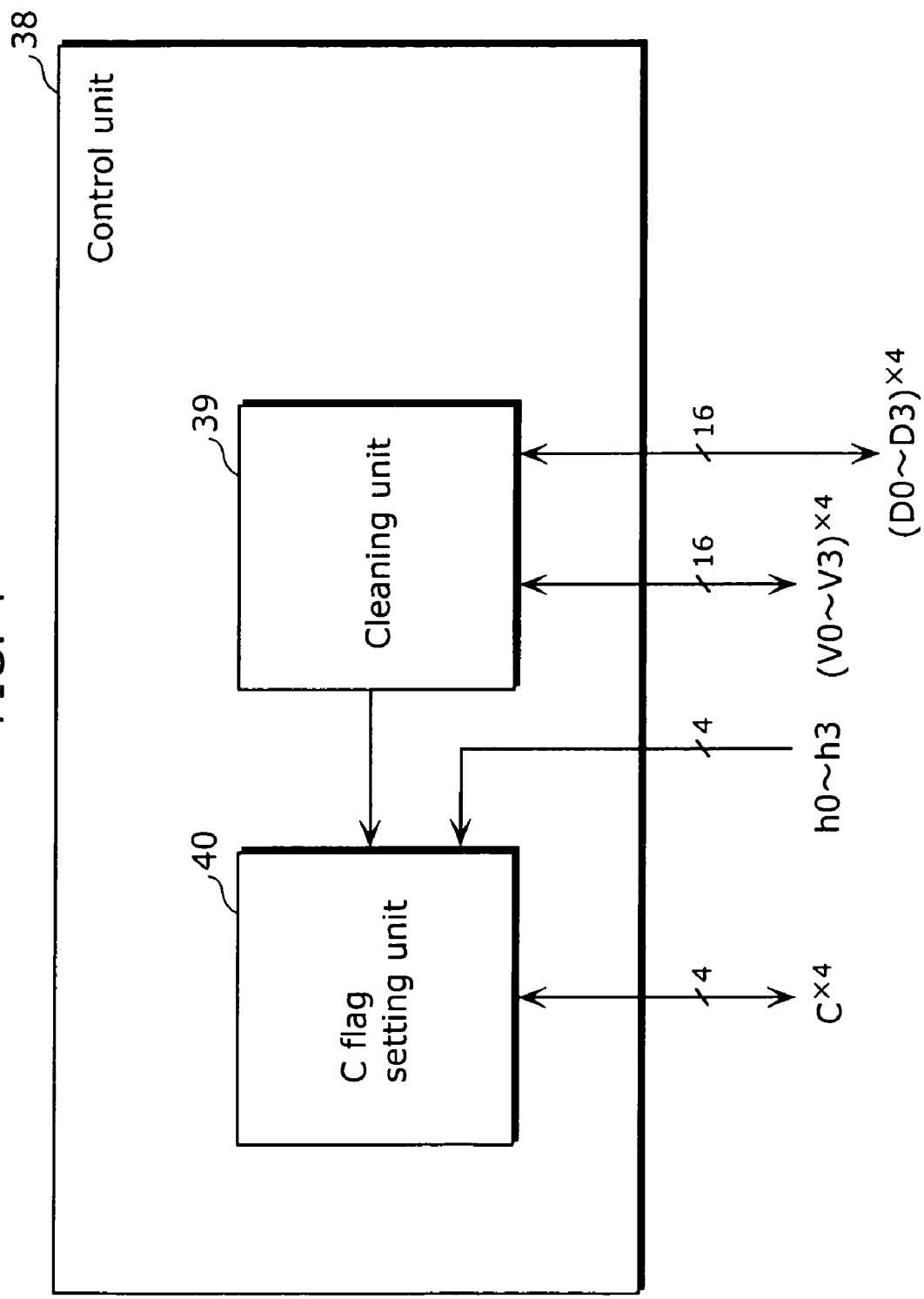
FIG. 4 is a block diagram showing the structure of the control unit.

FIG. 4 is a block diagram showing the structure of the control unit 38. As in the diagram, the control unit 38 includes a cleaning unit 39 and a C flag setting unit 40.

The cleaning unit 39 searches for a cache entry which is set with C=1, and performs a write back when such cache entry is dirty.

The C flag setting unit 40 sets a cleaning flag C in accordance with a command from the processor 1. The processor 1 issues, to the cache memory 3, a command instructing the setting of a cleaning flag to a cache entry which will no longer be written into.

<Structure of the C Flag Setting Unit>

Figure 5:
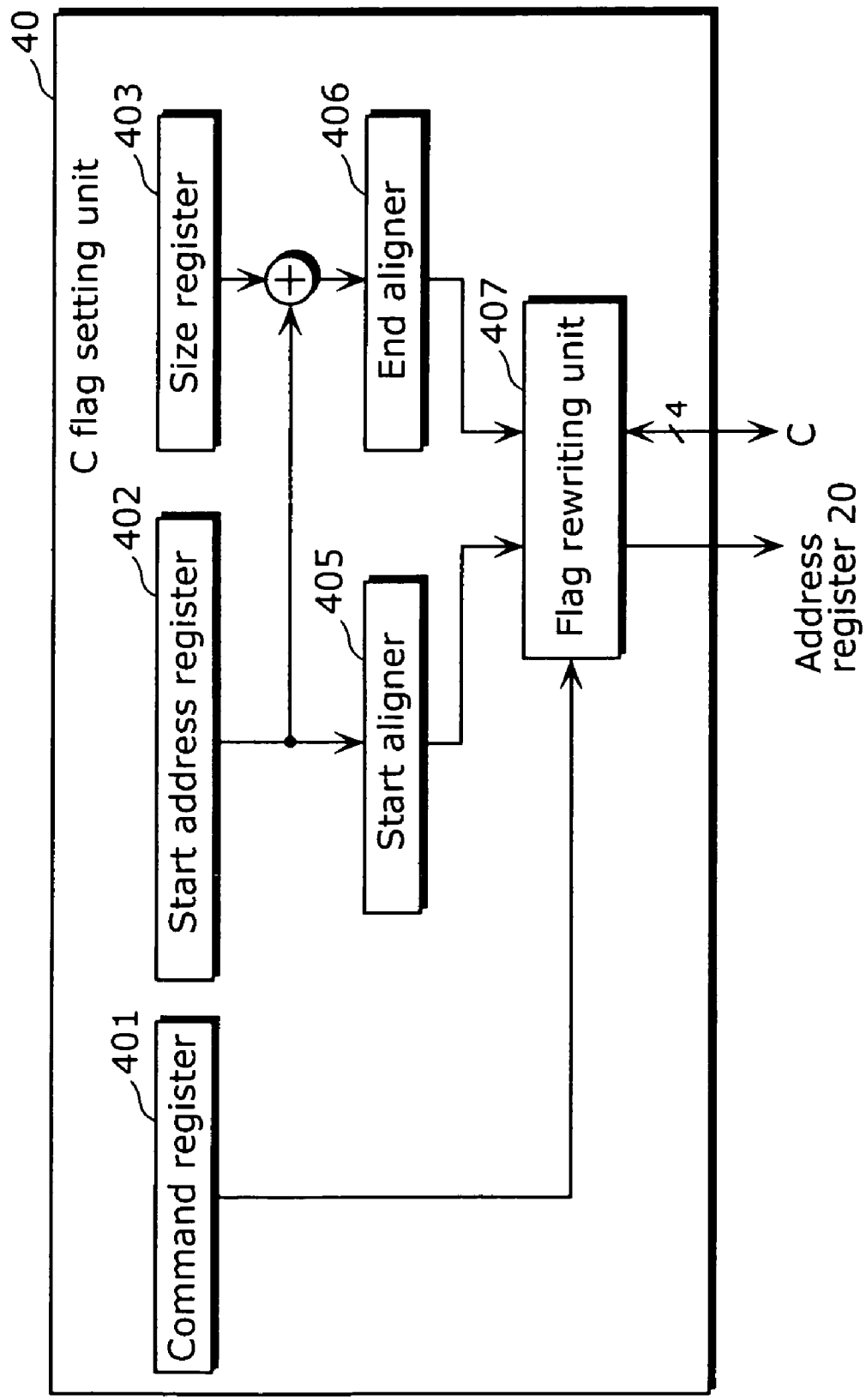
FIG. 5 is a block diagram showing an example of the structure of the C flag setting unit.

FIG. 5 is a block diagram showing an example of the structure of the C flag setting unit 40. As in the diagram, the C flag setting unit includes a command register 401, a start address register 402, a size register 403, an adding unit 404, a start aligner 405, an end aligner 406, and a flag rewriting unit 407.

Figure 6A:
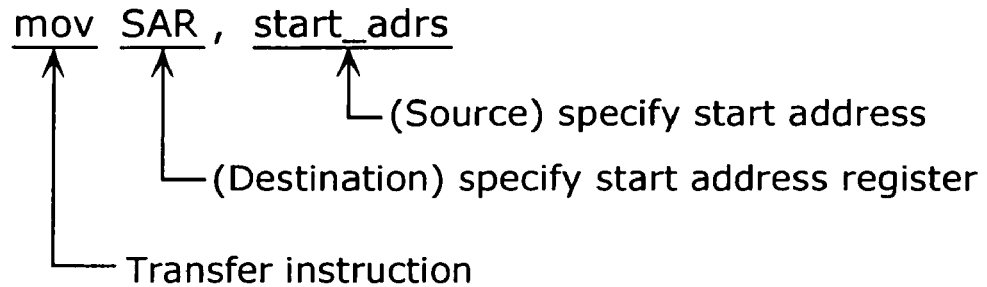
FIG. 6A shows an example of an instruction for writing a start address into the start address register.
Figure 6B:
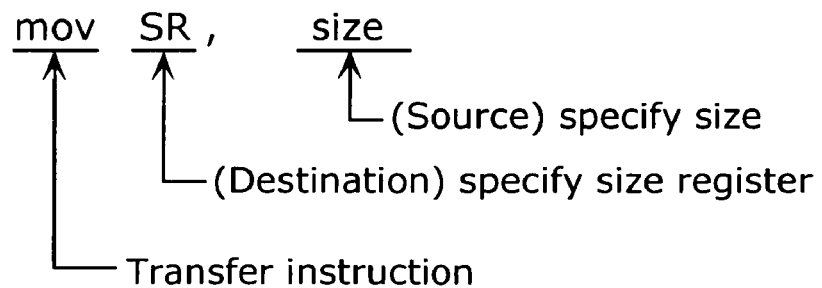
FIG. 6B shows an example of an instruction for writing a size into the size register.
Figure 6C:
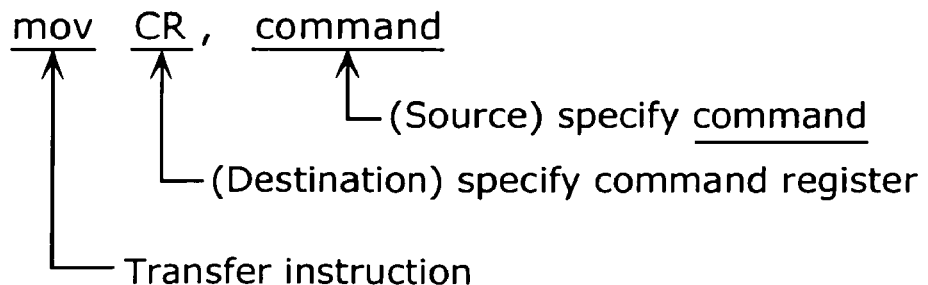
FIG. 6C shows an example of an instruction for writing a command into the command register.
Figure 6D:
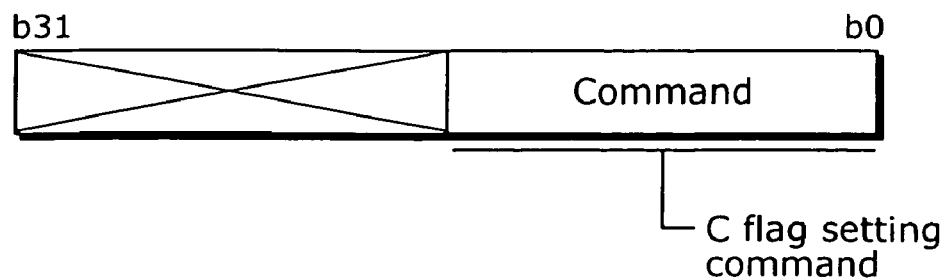
FIG. 6D shows an example of a command.

The command register 401 is a register that allows direct access from the processor 1, and holds a C flag setting command written by the processor 1. FIG. 6C shows an example of an instruction to write a command in the command register 401. This instruction is a normal transfer instruction (mov instruction), and specifies the command as a source operand and the command register (CR) 401 as the destination operand. FIG. 6D shows an example of a command. This command is a specific code indicating a C flag setting command. The C flag setting command is a command which instructs the setting of C flags to cache entries which hold the data corresponding to an address range which starts from the start address held in the start address register 402 and which has the size held in the size register 403.

The start address register 402 is a register which allows direct access from the processor 1, and holds a start address written by the processor 1. This start address indicates the starting position of an address range on which the C flags should be set. FIG. 6A shows an example of an instruction for writing a start address into the start address register 402. As in FIG. 6C, this instruction is also a normal transfer instruction (mov instruction).

The size register 403 is a register which allows direct access from the processor 1, and holds a size which is written by the processor 1. This size indicates an address range starting from the start address. FIG. 6B shows an example of an instruction for writing a size into the size register 403. As in FIG. 6C, this instruction is also a normal transfer instruction (mov instruction). Moreover, the size unit may be a number of bytes or a number of lines (number of cache entries), as long as it is a unit that is fixed in advance.

The adding unit 404 adds the start address held in the start address register 402 and the size held in the size register 403. The result of this addition is an end address indicating an ending position of the address range. The adding unit 404 adds byte addresses when the size is specified as a number of bytes, and adds line addresses when the size is specified as a number of lines.

The start aligner 405 adjusts a start address to the position of a line boundary. With this adjustment, the processor 1 can specify an arbitrary address as the start address, regardless of the line size and the line boundary.

The end aligner 406 adjusts an end address to the position of a line boundary. With this adjustment, the processor 1 can specify an arbitrary size for the aforementioned size, regardless of the line size and the line boundaries.

Figure 7:
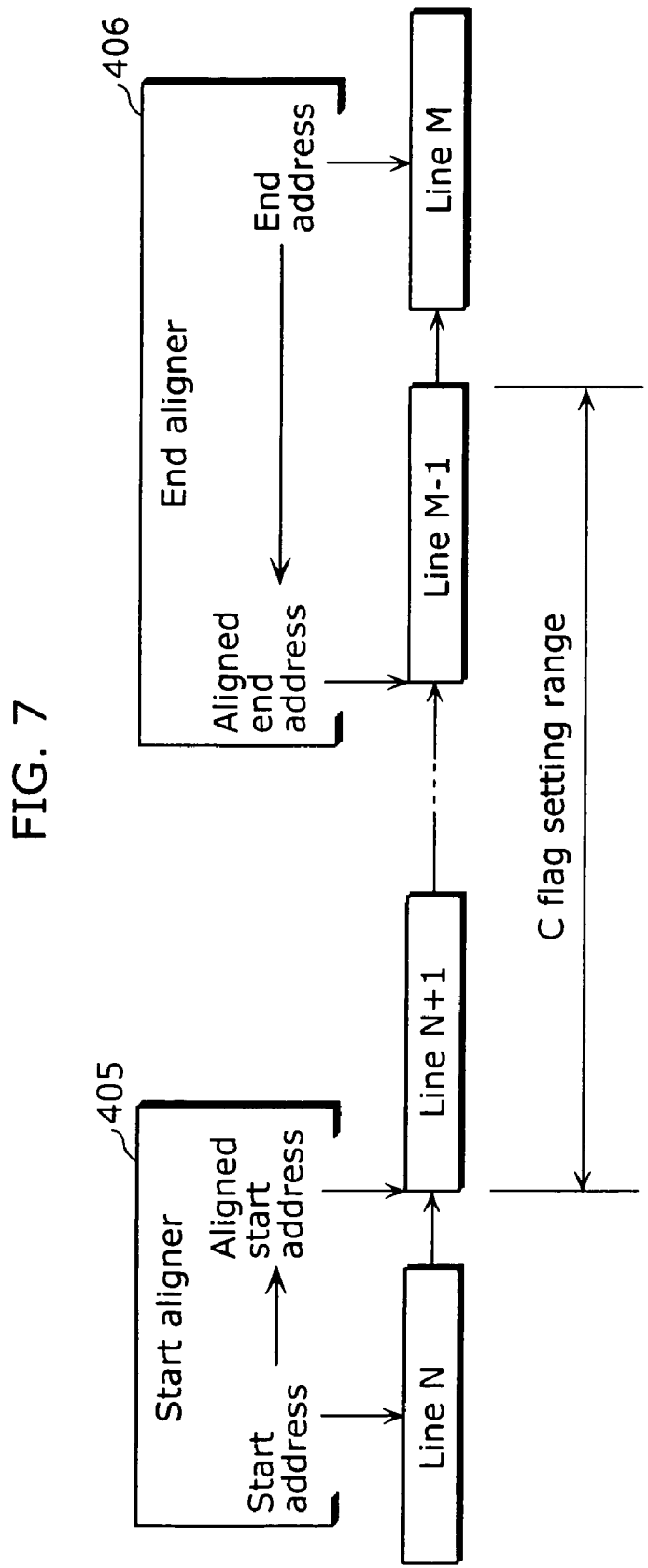
FIG. 7 shows an explanatory diagram for the start aligner and the end aligner.

FIG. 7 shows an explanatory diagram for the start aligner 405 and the end aligner 406. In the diagram, the start address specified by the processor 1 indicates an arbitrary position midway through a line N. The start aligner 405 makes an adjustment so that the beginning of the next line (N+1) is indicated, and outputs the adjusted address as an aligned start address. The line indicated by the aligned start address is called a start line.

Furthermore, the end address indicates an arbitrary position midway through a line M. The end aligner 406 makes an adjustment so that the beginning of the immediately preceding line (M−1) is indicated, and outputs the adjusted address as an aligned end address. A line indicated by the aligned end address is called an end line.

In this case, C flags are set to respective lines (cache entries) from the start line (line (N+1)) to the end line (line (M−1)). In this manner, the start aligner 405 and the end aligner 406 align inwards of the address range, from the start address to the end address, specified by the processor 1, as there is a possibility that a write operation by the processor may occur on the outer portions of the line N and the line M.

The flag rewriting unit 407 sets, to 1, the C flags from the line indicated by the aligned start address to the line indicated by the aligned end address (in the example in FIG. 7, from the line (N+1) to the line (M−1)), when corresponding data is in the cache memory 3.

<C Flag Setting Process>

Figure 8:
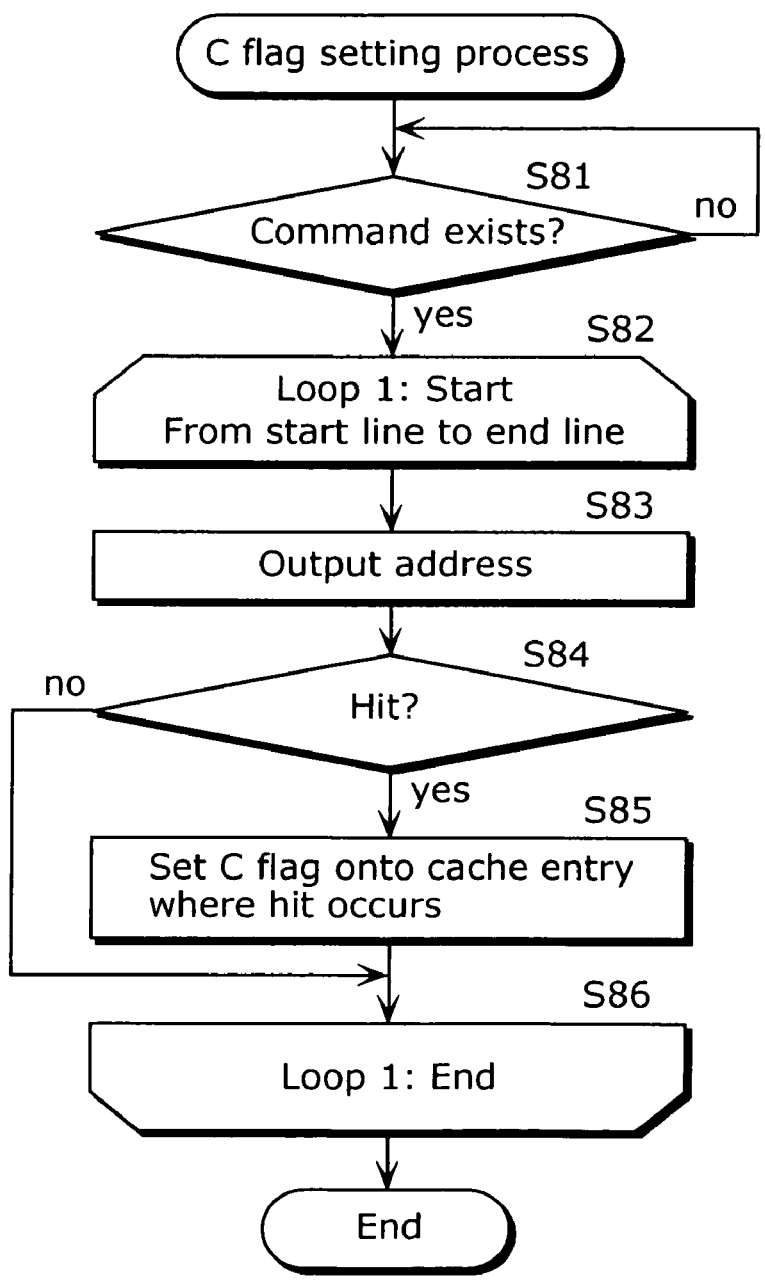
FIG. 8 is a flowchart showing an example of the C flag setting process by the flag rewriting unit.

FIG. 8 is a flowchart showing an example of the C flag setting by the flag rewriting unit 407.

In the case where a C flag setting command is held in the command register 401, the flag rewriting unit 407 performs a loop 1 process while sequentially outputting the respective line addresses from the start line to the end line (S82 to S86). Here, as the flag rewriting unit 407 performs the same process for each line, the process for only one line shall be discussed.

More specifically, while the cache memory 3 is not accessed by the processor 1, the flag rewriting unit 407 outputs a line address to the address register 20 (S83); causes the comparators 32a to 32d to compare the tag address in the address register 20 and the tag of the cache entries; and judges whether or not there is a hit (S84). In addition, in the case of a hit, the flag rewriting unit 407 sets 1 to the C flag of the cache entry where the hit occurred (S85) and, in the case of a mishit, nothing is done as corresponding data is not in the cache memory 3.

With this, 1 is set in the C flags of each of the lines from the start line to the end line, in the case where corresponding data is in the cache memory 3.

<Cleaning Process>

Figure 9:
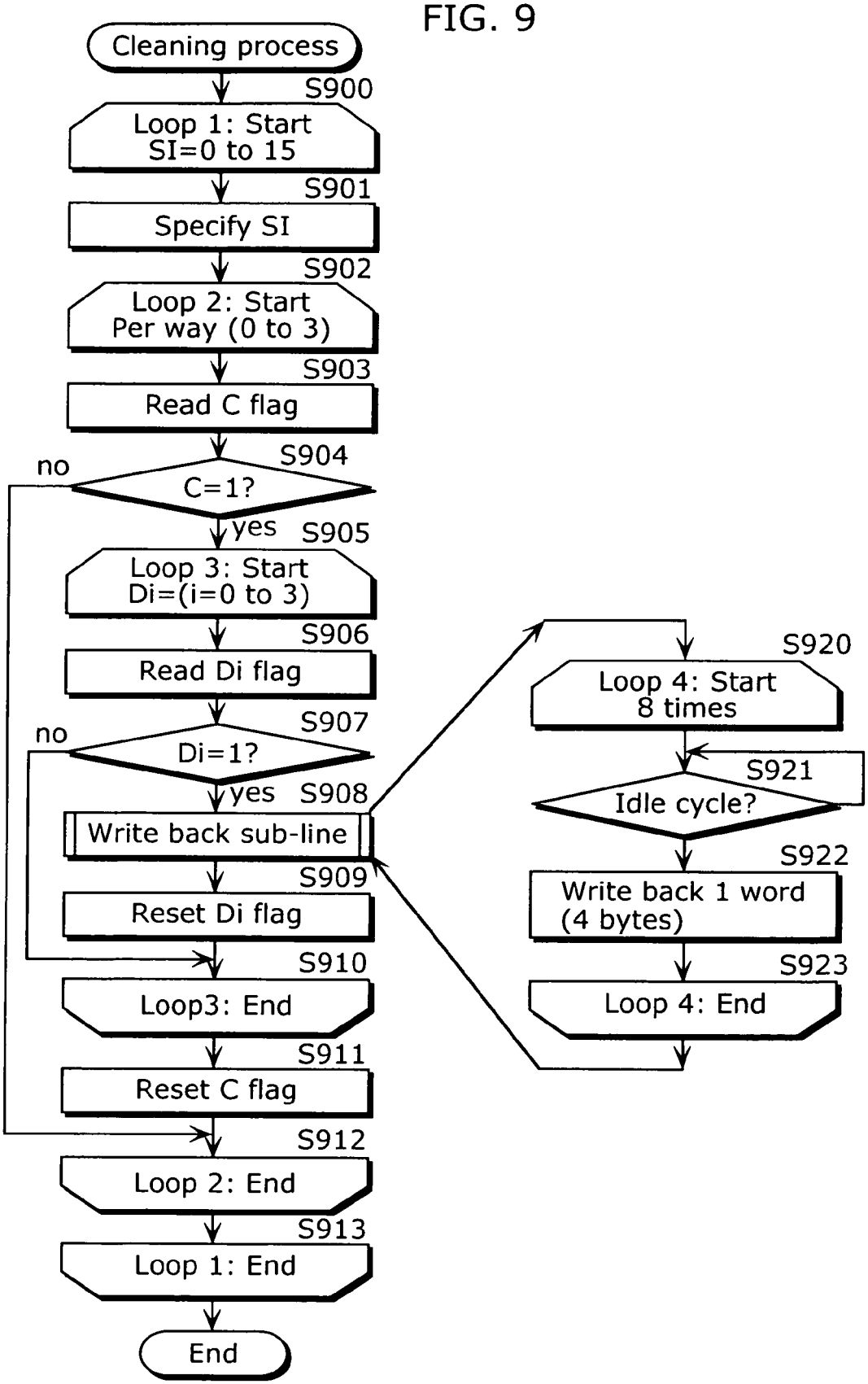
FIG. 9 is a flowchart showing an example of the cleaning process by the cleaning unit.

FIG. 9 is a flowchart showing an example of the cleaning process by the cleaning unit 39.

As in the diagram, by sequentially specifying set indices (SI) 0 to 15 (S901) in the loop 1 processing (S900 to S913), the cleaning unit 39 performs loop 2 processing on all the 16 sets. By reading the respective C flags of the ways within a set (S903) in the loop 2 processing (S900 to S913), the cleaning unit 39 searches for a cache entry having C=1 (S904). In loop 3 processing (S905 to S910), the cleaning unit 39 reads, on a per sub-line basis, dirty flags of the cache entry having C=1 (S906), and when dirty (S907), writes back, to the memory 2, the data of such sub-line (S908) and resets the dirty flag of such sub-line to 0 (S909). In the write back of such sub-line data, the cleaning unit 39 writes back, in an idle cycle (S920), one word at time (S922), as in loop 4 processing (S920 to S923).

In this manner, the cleaning unit 39 sequentially checks the C flags of all the cache entries, searches for a cache entry having C=1, and, when dirty, writes back such cache entry from the cache memory to the memory 2.

As described thus far, according to the cache memory in the present embodiment, a caching termination attribute (C flag) indicating whether or not caching is allowed to be terminated is added to a cache entry belonging to an address range specified by the processor 1, and a cache entry which will not be written into is written back before the occurrence of a cache miss. Therefore, during a cache miss, only a load penalty occurs, and the occurrence of a write back penalty can be decreased. With this, it is possible to improve the efficiency of the cache memory, and improve access speed.

Furthermore, the processor can specify arbitrary addresses as the address range to which caching termination attributes are set, regardless of the line size and line boundaries of the cache memory. With this, the need for a programmer and compiler to be conscious of the line size and line boundaries is eliminated and, therefore, cache address management with respect to cleaning need not be performed, and program creation can be made easier.

In addition, since only a dirty sub-line is written back on a sub-line basis in the cleaning process, high-speed write back can be facilitated as compared to when write back is performed on a per line basis.

<Variations>

Note that the cache memory in the present invention is not limited to the structure in the aforementioned embodiment, and various types of variations are possible. Hereinafter, a number of variations shall be described.

(1) In FIG. 5, the C flag setting unit 40 may include an end address register instead of the size register 403 and the adding unit 404. In this case, the end address register holds an end address written by the processor 1.

(2) The processor 1 may execute a store instruction for writing data while adding a caching termination attribute. In addition, the control unit 38 may include an instruction detection unit which detects the store instruction for writing data while adding a caching termination attribute, and a flag setting unit which sets C=1 during the writing in accordance with such store instruction.

(3) The respective instructions shown in FIGS. 6A, 6B and 6C may be inserted, by a compiler, within a program. At that time, the compiler may insert the above-mentioned respective instructions in a position in the program which will not be performed of further write operations such as the writing of array data, the writing of block data during the decoding of compressed video data, and the like.

(4) It is also possible to have a structure in which the cache entry does not hold a C flag. Stated differently, the C flag setting process shown in FIG. 8 and the cleaning process shown in FIG. 9 may be performed at the same time. In this case, in place of setting a C flag to a cache entry in S85 in FIG. 8, the loop 3 (S905 to S910) in FIG. 9 may be executed.

(5) Although in the aforementioned embodiment, description is made exemplifying a 4-way set-associative cache memory, the number of ways may be 8 ways or 16 ways. Furthermore, although in the aforementioned embodiment, an example having 16 as the number of sets is described, it is possible to have any number of sets.

(6) Although in the aforementioned embodiment, description is made exemplifying a set-associative cache memory, it is possible to have a fully associative cache memory.

Second Embodiment

In the first embodiment, description is made regarding a structure using a C flag indicating whether or not a write operation is to be performed. In the present embodiment, description shall be made regarding a structure using, in place of the C flag, a W (weak) flag indicating whether or not there will be any further usage (whether or not write and read operations will be performed).

<Structure of the Cache Memory>

Figure 10:
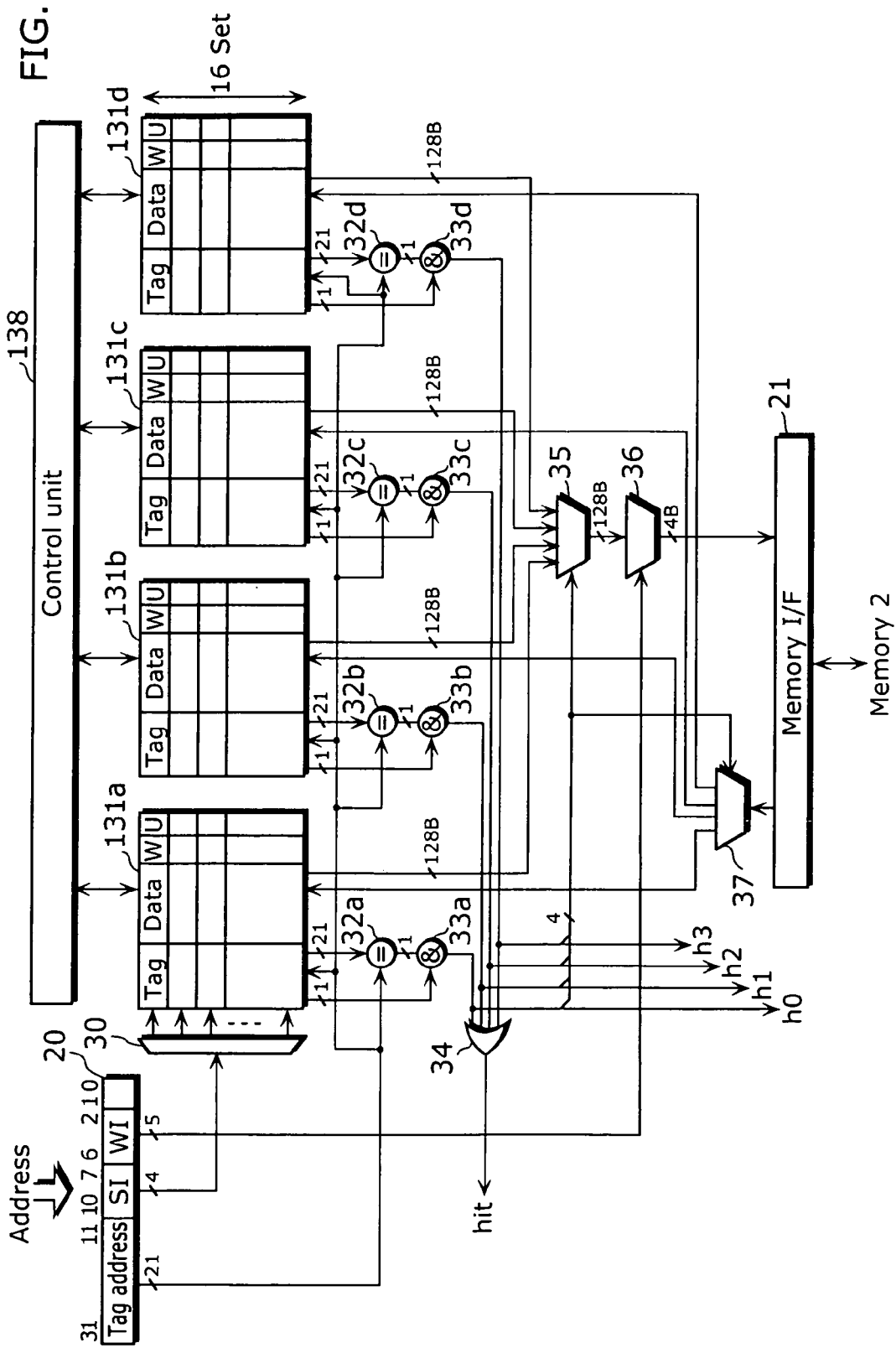
FIG. 10 is a block diagram showing the structure of the cache memory in the second embodiment of the present invention.

FIG. 10 is a block diagram showing the structure of the cache memory in the second embodiment of the present invention. The cache memory in the diagram is different, compared to the structure in FIG. 2, in including ways 131a to 131d in place of the ways 31a to 31d; and in including a control unit 138 in place of the control unit 38. Hereinafter, description shall be focused on the points of difference, while omitting the points which are the same.

The way 131a is different, compared with the way 31a, in having the C flag eliminated, and in having a W flag and a U flag added, in each of the cache entries. The same is true for the ways 131b to 131d.

Figure 11:
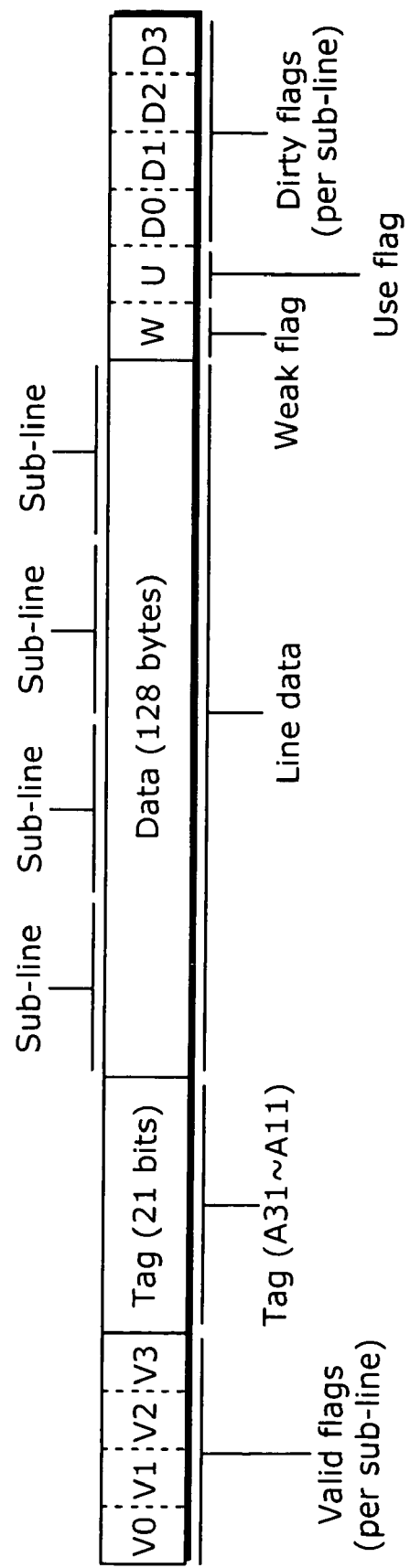
FIG. 11 is a diagram showing the bit structure of a cache entry.

FIG. 11 shows the bit structure of a cache entry. A cache entry holds valid flags V0 to V3, a 21-bit tag, a 128-byte line data, a week flag W, a use flag U, and dirty flags D0 to D3.

Among these, the weak flag represents whether or not there will be any further usage with regard to access from the processor, and represents, with regard to replacement control in the cache memory, the weakest subject for replacement that can be evicted before other cache entries. In this manner, since the weak flag W has two meanings, it is referred to in the two processes of cleaning and replacement.

The use flag U indicates whether or not there has been an access to the cache entry, and is used, in replacement due to a mishit using the LRU scheme, in place of access order data among the cache entries of the four ways. More accurately, a 1 in the use flag U means an access has been made, and a 0 in the use flag means no access has been made. However, when the use flags of the four ways within a set all become 1, they are reset to 0. Stated differently, the use flag U indicates the two relative states of whether the time of access is old or new. In other words, it means that a cache entry with a use flag as 1 has been accessed more recently than a cache entry having a use flag as 0.

The control unit 138 is different, compared to the control unit 38, in that it sets a W flag instead of the C flag, and in that it uses a use flag U in place of the access order information for the LRU scheme.

<Structure of the Control Unit>

Figure 12:
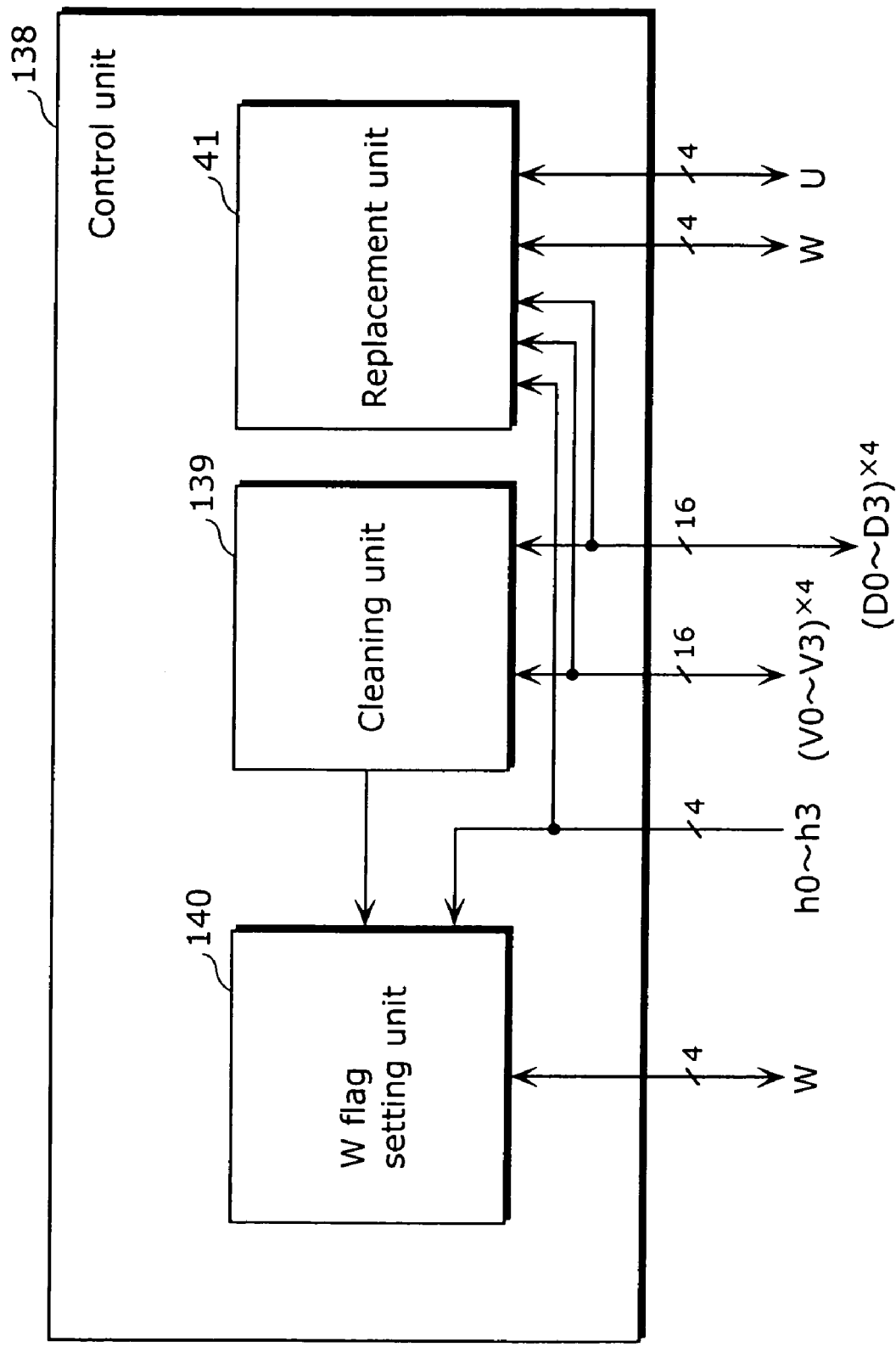
FIG. 12 is a block diagram showing the structure of the control unit.

FIG. 12 is a block diagram showing the structure of the control unit 138. The control unit 138 in the diagram is different, compared to the control unit 38, in including a cleaning unit 139 and a W flag setting unit 140 in place of the cleaning unit 39 and the C flag setting unit 40 respectively, and in having a replacement unit 41 added.

The cleaning unit 139 is different, compared to the cleaning unit 39, in that it refers to the W flag instead of the C flag. As a result, write back is performed on a cache line which has W=1 and which is dirty.

The W flag setting unit 140 sets a weak flag W according to a command from the processor 1. The processor 1 issues, to the cache memory 3, a command instructing the setting of a weak flag to a cache entry which will no longer be used (write and read). A cache entry having W=1, when dirty, becomes the subject for cleaning and, in addition, is the first subject for replacement when a cache miss occurs.

The replacement unit 41 performs replacement during a cache miss, according to a pseudo-LRU scheme with the use flag U serving as the access order; and updating of the use flag U when the cache memory is accessed. In the replacement process, a cache entry having W=1 is the very first to be selected as a subject for replacement.

<Description of the Use Flag U>

Figure 13:
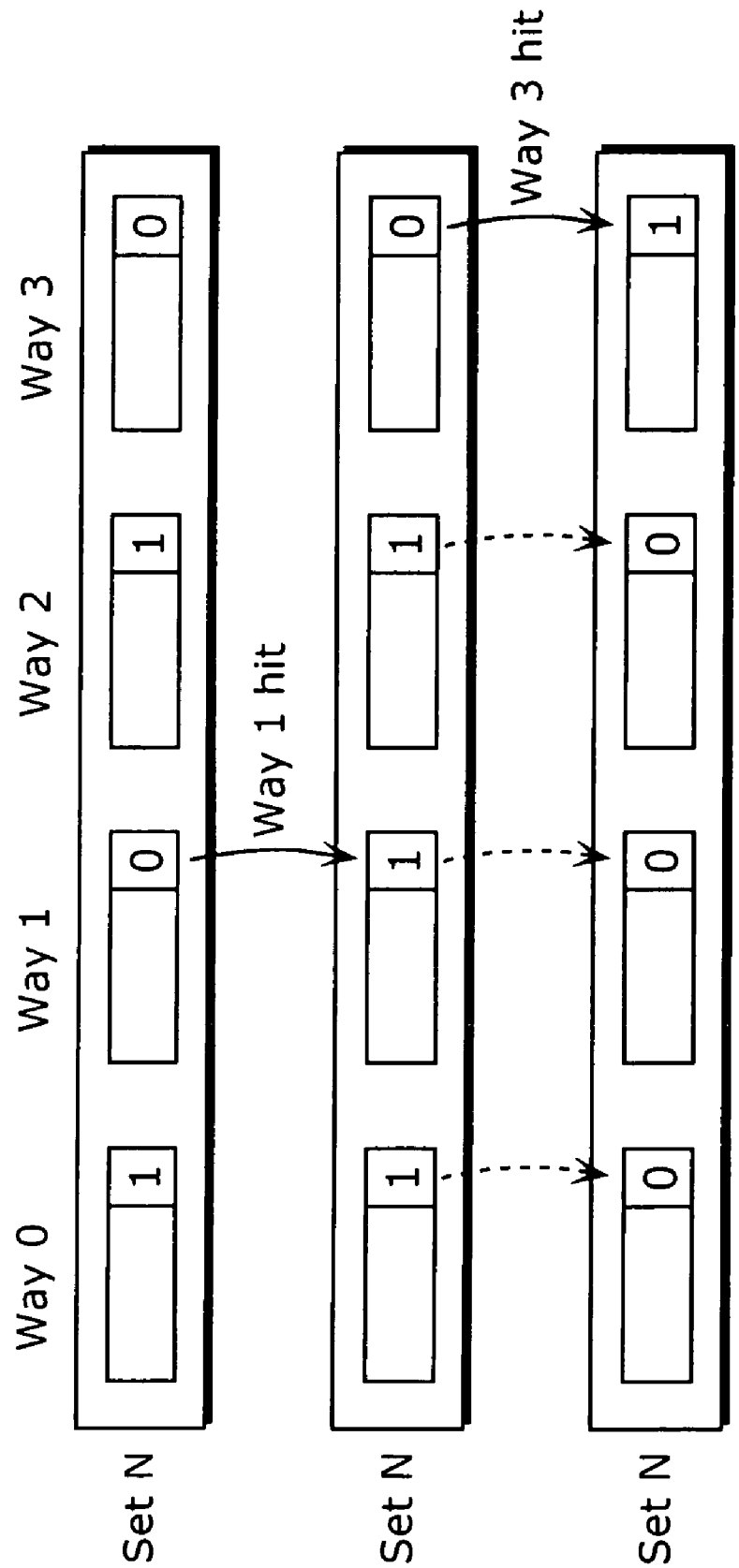
FIG. 13 shows an example of the use flag updating by the replacement unit.

FIG. 13 shows an example of use flag updating by the replacement unit 41. The upper stage, middle stage, and lower stage in the diagram represent four cache entries making up a set N which straddles the ways 0 to 3. The 1 or 0 at the right end of the four cache entries are respective use flag values. The four use flags U are written as U0 to U3.

In the top stage of the diagram, (U0 to U3)=(1, 0, 1, 0), which means that there was an access to the respective cache entries of the ways 0 and 2, and no access to the respective cache entries of the ways 1 and 3.

In this situation, when a hit occurs in the cache entry of the way 1 within the set N during a memory access, an update (U0 to U3)=(1, 1, 1, 0) is made, as shown in the middle stage in the diagram. More specifically, as shown by the solid line, the use flag U1 of the way 1 is updated from 0 to 1.

In addition, in the situation shown in the middle stage in the diagram, when a hit occurs in the cache entry of the way 3 within the set N during a memory access, an update (U0 to U3)=(0, 0, 0, 1) is made. More specifically, as shown by the solid line, the use flag U1 of the way 3 is updated from 0 to 1. In addition, as shown by the broken lines, the use flags, U0 to U2, other than that for the way 3, are updated from 1 to 0. With this, it means that the cache entry of the way 3 has been accessed more recently than the respective cache entries of the way 0 to 2.

When a cache entry having W=1 does not exist at the time of a cache miss, the replacement unit 41 determines the cache entry to be the subject for replacement based on the use flags, and performs the replacement. For example, the replacement unit 41 determines either one of the way 1 and the way 3 to be the subject for replacement in the upper stage in FIG. 5; determines the way 3 as the replacement subject in the middle stage in FIG. 5; and determines any one of the ways 0 to 2 to be the replacement subject in the lower stage in FIG. 5.

<Description of the Weak Flag>

Figure 14A:
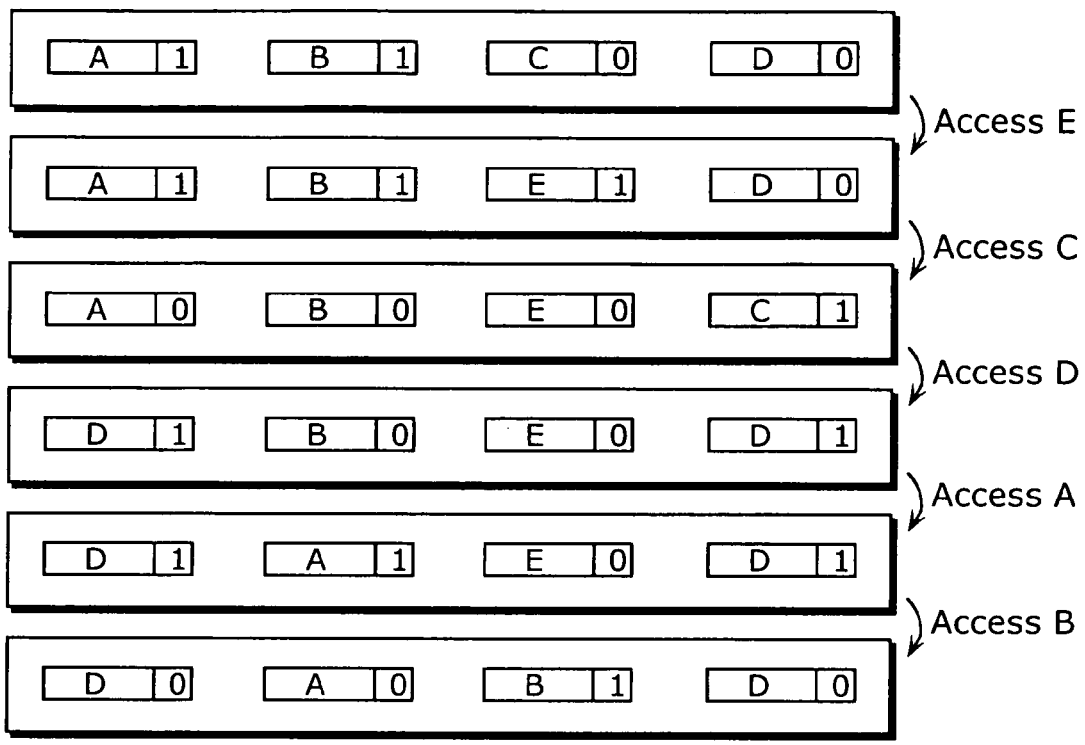
FIG. 14A is a diagram showing the replacement of cache entries in the case where a weak flag does not exist.

FIG. 14A is a comparative example for when a weak flag is assumed not to exist, and is a diagram showing the replacement of a cache entry. The diagram also shows, as in FIG. 13, the four cache entries making up the set N which straddles the ways 0 to 3. The 1 or 0 at the right end of the four cache entries are the values of the respective use flags. Furthermore, it is assumed that only data E is seldom accessed data, and data A, B, C, and D are frequently accessed data.

In the situation in the first stage of FIG. 14A, a cache miss occurs when the processor 1 accesses the data E. Due to this cache miss, for example, among cache entries having U=0, the cache entry of the frequently accessed data C is replaced with the seldom accessed data E, and the situation in the second stage is arrived at.

In the situation in the second stage, a cache miss occurs when the processor 1 accesses the data C. Due to this cache miss, the cache entry of the frequently accessed data D, which is a cache entry having U=0, is replaced with the frequently accessed data C, and the situation in the third stage is arrived at.

In the situation in the third stage, a cache miss occurs when the processor 1 accesses the data D. Due to this cache miss, for example, the cache entry of the frequently accessed data C is replaced with the frequently accessed data D, and the situation in the third stage is arrived at.

Likewise in the fourth stage, the seldom used data E is not selected as the subject for replacement, and is left in the cache memory.

In the situation in stage 5, since the seldom used data E is the oldest (U=0), it is selected as the subject for replacement, and is evicted.

In this manner, in the pseudo-LRU scheme (likewise, in the normal LRU scheme), there are cases where, at worst, a cache miss is induced four times when there are four ways, due to the seldom accessed data E.

Figure 14B:
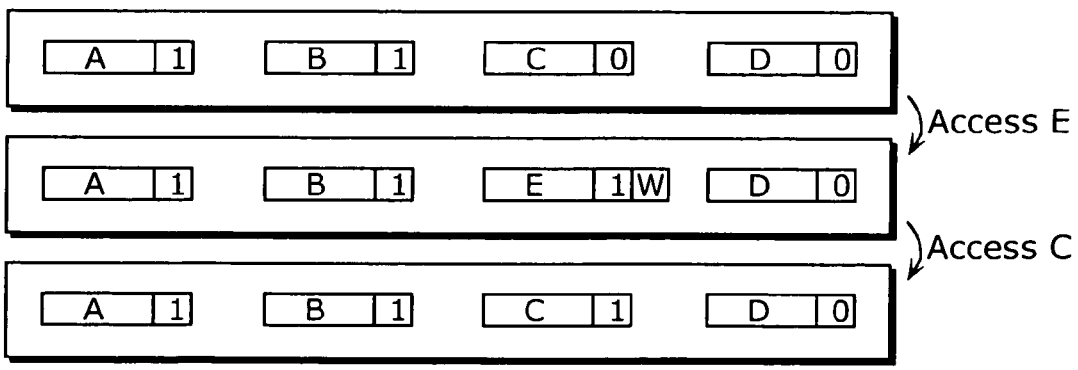
FIG. 14B is an explanatory diagram showing the role of the weak flag W in the replacement process.

FIG. 14B is an explanatory diagram showing the role of the weak flag W in the replacement process. In the situation in the first stage in FIG. 14B (same as the first stage in FIG. 14A, a cache miss occurs when the processor 1 accesses the data E. Due to this cache miss, for example, among the cache entries having U=0, the cache entry of the frequently accessed data C is replaced with the seldom accessed data E. At this time, it is assumed that the processor 1 sets a weak flag W as 1 in the cache entry of data E. With this, the cache entry of the data E is the first to be evicted during a cache miss, and the situation in the second stage is arrived at.

In the situation in the second stage, a cache miss occurs when the processor 1 accesses the data C. Due to this cache miss, the cache entry of the seldom accessed data E, which is the cache entry having W=1, is selected as the subject for replacement, and is replaced with the frequently used data C, and the situation in stage 3 is arrived at.

In this manner, by providing a weak flag, it is possible to reduce the inducement of cache misses, due to seldom accessed data.

<W Flag Setting Process>

Figure 15:
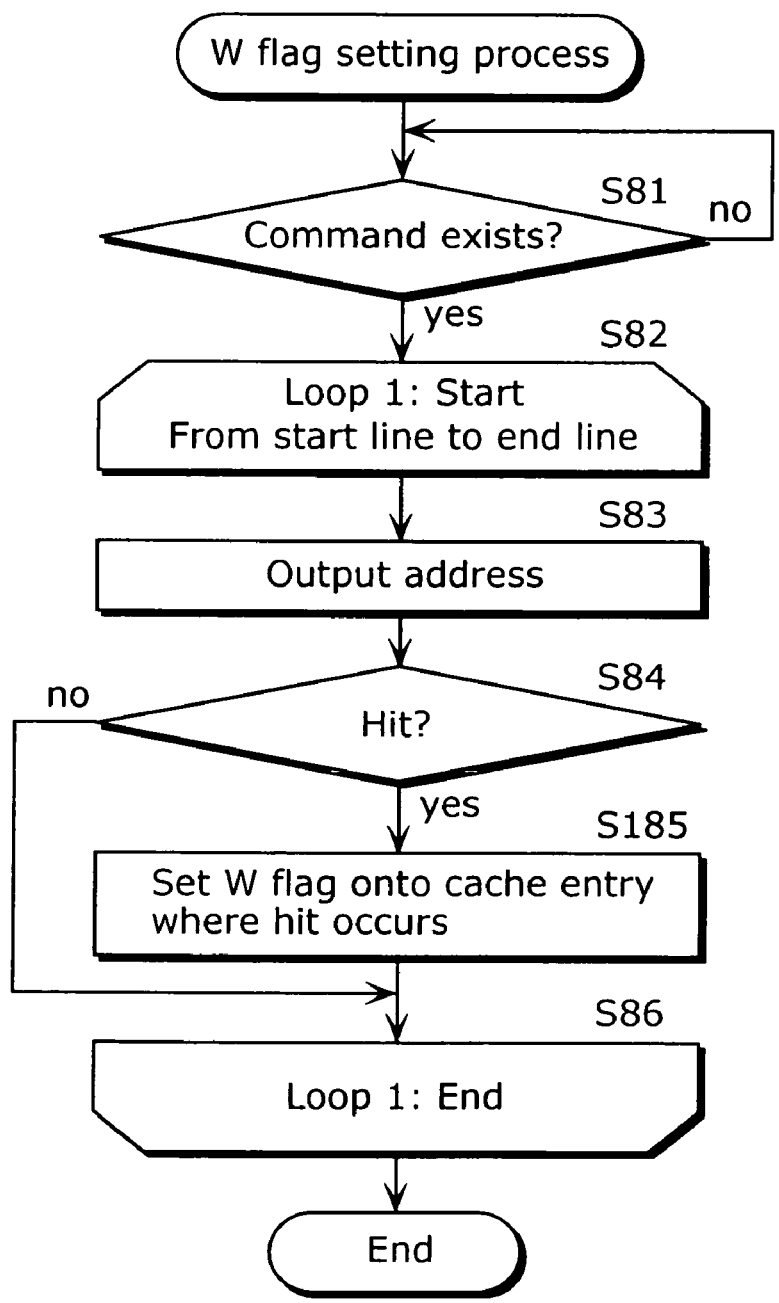
FIG. 15 is a flowchart showing the W flag setting process by the W flag setting unit.

FIG. 15 is a flowchart showing the W flag setting by the W flag setting unit 140. The structure of the W flag setting unit 140 is the same as the C flag setting unit shown in FIG. 5 and, in addition, the W flag setting command from the processor 1 is also the same as that in FIG. 6A to 6D. However, the processor 1 sets the address range for data which will no longer be used (neither written nor read) together with the W flag setting command.

FIG. 15 is different, compared to FIG. 8, in having a step 5185 in place of the step S85. As the rest is the same as the C flag setting in FIG. 8, their description shall be omitted.

In step 5185, the W flag setting unit 140 sets W=1 in the cache entry in which a hit occurs, according to S84.

<Cleaning Process>

Figure 16:
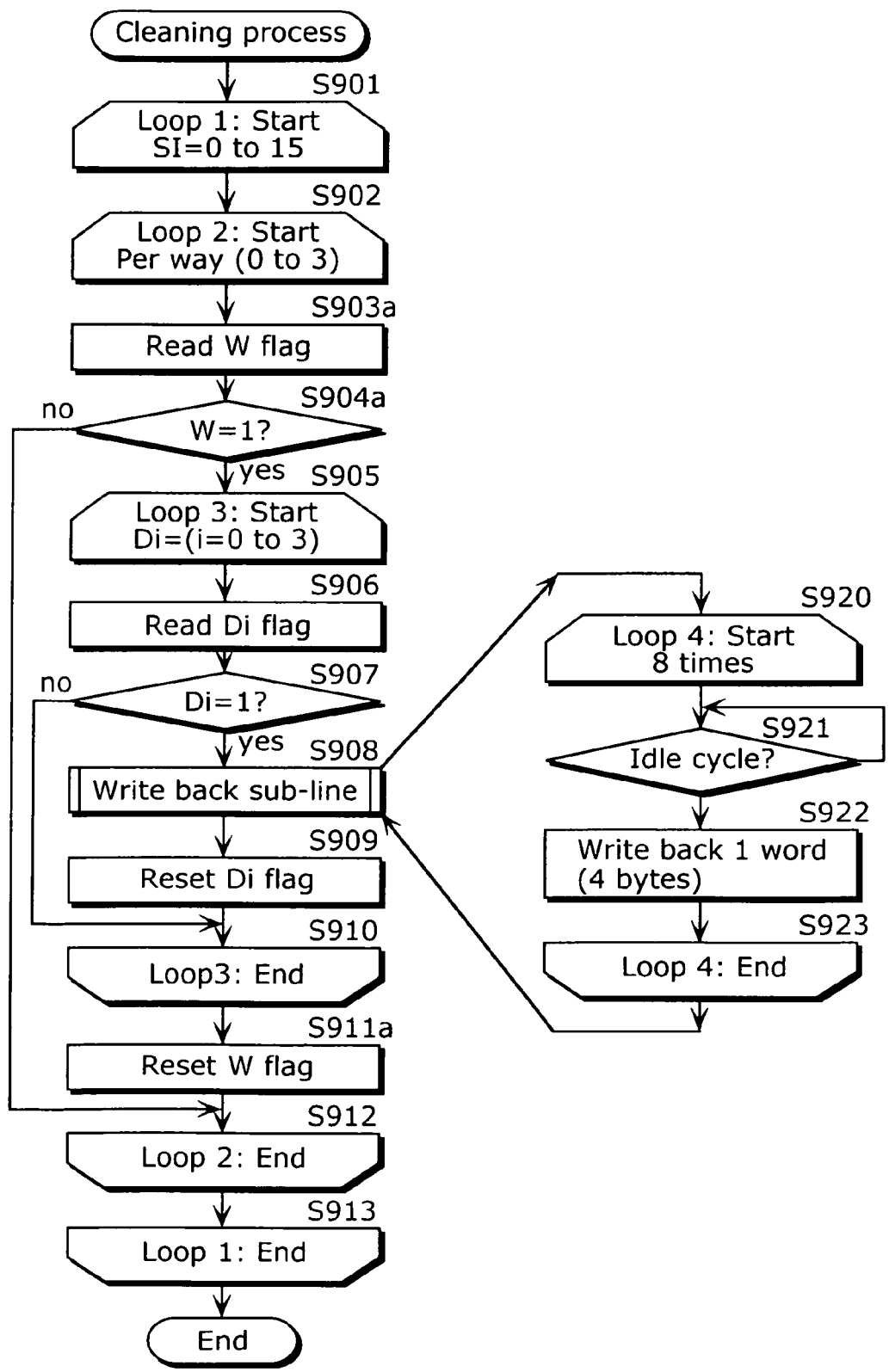
FIG. 16 is a flowchart showing the cleaning process by the cleaning unit.

FIG. 16 is a flowchart showing the cleaning by the cleaning unit 139.

The diagram is different, compared to FIG. 9, in having S903*a*, S904*a*, and S911*a* in place of S903, S904, and S911. As all of S903*a*, S904*a*, and S911*a* are different only in having the expression "W flag" in place of "C flag", and all the rest have the same process details, description shall be omitted.

<U Flag Updating Process>

Figure 17:
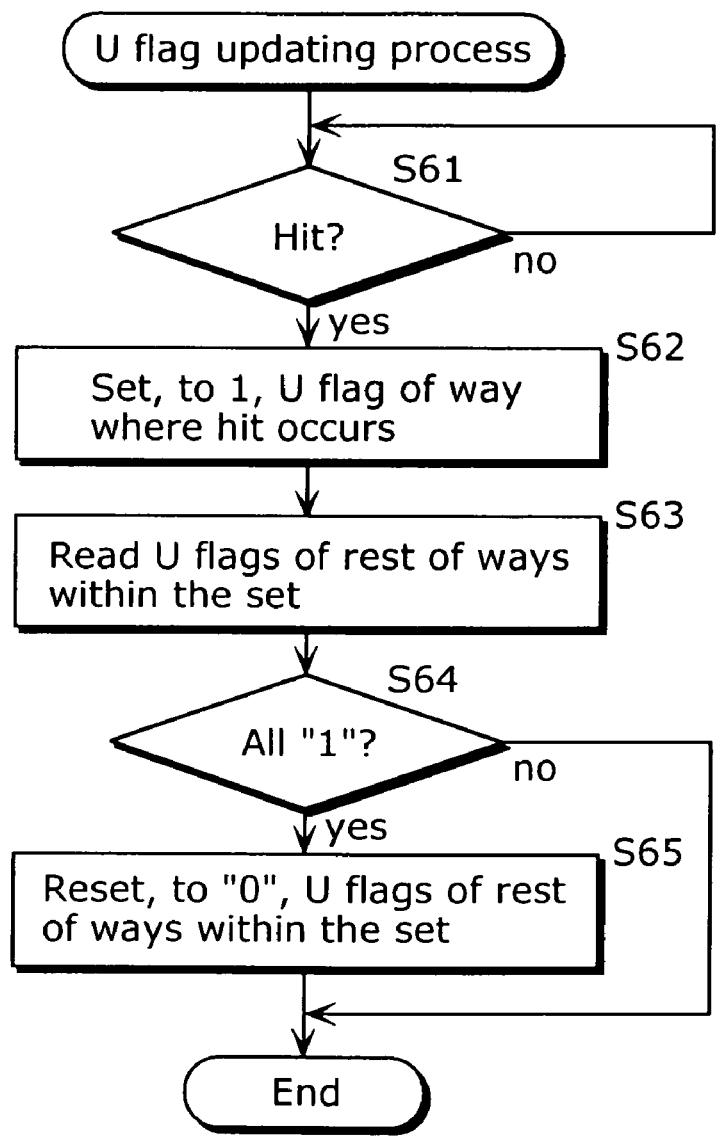
FIG. 17 is a flowchart showing the U flag updating process by the replacement unit.

FIG. 17 is a flowchart showing the U flag updating by the replacement unit 41. In the diagram, it is assumed that the use flag of a cache entry having a valid flag as 0 (invalid) is initialized to 0.

In the diagram, when a cache hit occurs (Step S61), the replacement unit 41 sets, to 1, the use flag of the way, in the set selected according to the set index, in which the hit occurred (Step S62), reads the use flags U of the rest of the ways in such set (Step S63), and judges whether or not the read use flags U all indicate 1 (Step S64). When all do not indicate 1, the process is concluded and, when all indicate 1, all the use flags U of the rest of the ways are reset to 0 (Step S65).

In this manner, the replacement unit 41 updates the use flag U as in the example of updating shown in FIG. 13 and FIGS. 14A and 14B.

<Replacement Process>

Figure 18:
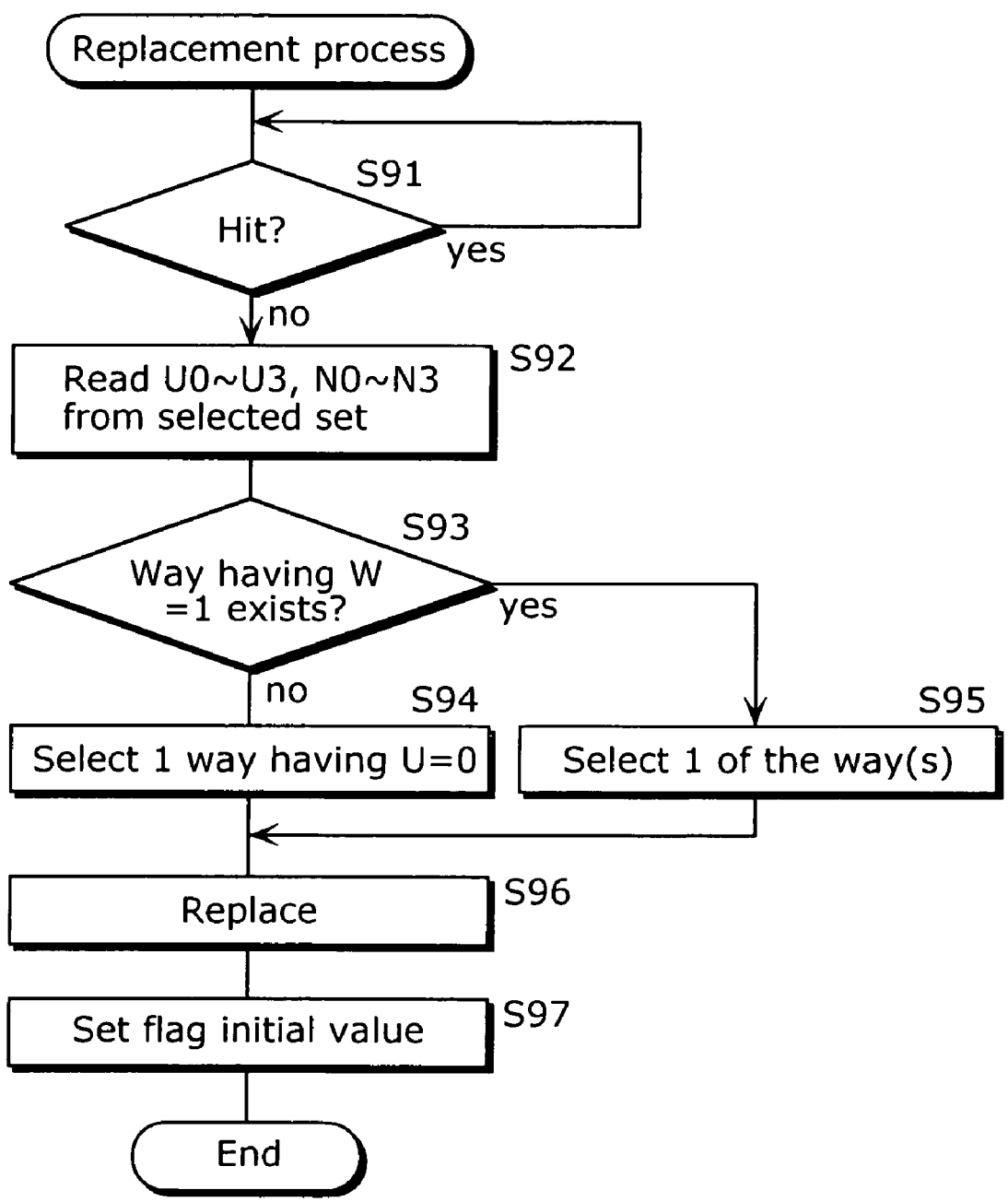
FIG. 18 is a flowchart showing the replacement process by the replacement unit.

FIG. 18 is a flowchart showing the replacement process by the replacement unit 41. In the diagram, when a miss occurs in a memory access (Step S91), the replacement unit 41 reads the use flags U and the weak flags W of the four ways in the set selected according to the set index (Step S92), and judges whether or not a way having W=1 exists (Step S93). When it is judged that there is no way having W=1, one way having U=0 is selected (Step S94). At this time, when there is a plurality of ways having use flags as 0, the replacement unit

40 randomly selects one. Furthermore, when it is judged that a way having W=1 exists, one way having W=1 is selected regardless of the U flag value (Step S95). At this time, when there is a plurality of ways having a weak flag W as 1, the replacement unit randomly selects one.

In addition, the replacement unit 41 performs replacement, with the cache entry of the selected way in such set as the subject (Step S96) and, after replacement, initializes the use flag U and the weak flag W of such cache entry to 1 and 0 respectively (Step S97). Moreover, at this time, the valid flag V and the dirty flag D are initialized to 1 and 0 respectively.

In this manner, when a way having W=1 does not exist, one among cache entries having a use flag U as 0, is selected as the subject for replacement.

Furthermore, when a way having W=1 exist, one, among cache entries of ways having W=1, is selected as the subject for replacement, regardless of whether the use flag indicates 0 or 1. With this, it is possible to reduce the inducement of cache misses due to seldom accessed data being left in the cache memory, as shown in FIGS. 14A and 14B.

As described thus far, according to the cache memory in the present embodiment, by cleaning a line having a weak flag W=1, as a line which will no longer be written into by the processor, write penalties at the time of a cache miss can be reduced.

Furthermore, as W=1 is set in a cache entry which will no longer be used, and the cache entry having W=1 is selected first as the replacement subject, it is possible to reduce the inducement of cache misses due to seldom accessed data being left in the cache memory.

Furthermore, since a 1-bit flag becomes sufficient as access order data through the adoption of a pseudo-LRU scheme using a 1-bit use flag in place of data indicating the access order in the conventional LRU scheme, hardware dimensions can be made smaller as the data volume of the access order data is small and updating is simple.

<Variations>

Note that the cache memory in the present invention is not limited to the structure in the aforementioned embodiment, and various types of variations are possible. Hereinafter, a number of variations shall be described.

(1) It is possible to have a structure in which, in place of the pseudo-LRU scheme using the use flag U, order data indicating the access order for the four ways is held and updated on a per cache entry basis, and the subject for replacement is selected using the conventional LRU scheme. Likewise, in this case, a cache entry having W=1 may be selected first as the replacement subject, regardless of the access order.

(2) It is also possible to have a structure in which both the C flag shown in the first embodiment and the W flag in the present embodiment are provided. In this case, it is possible to use the C flag in the cleaning process, and use the W flag only in selecting the subject for replacement. In so doing, using the C flag, a cache entry with the possibility of being read, and which will no longer be written into, can be left in the cache memory after cleaning. A cache entry that will no longer be read from nor written into is cleaned and selected first as the subject for replacement. With the combined use of the C flag and W flag, finely detailed control can be performed.

(3) Although in the aforementioned embodiment, the size of a sub-line is made out to be ¼ of the line size, other sizes such as ½, ⅛, 1/16 and so on, are also possible. In such cases, each cache entry may hold the same number of valid flags and dirty flags as the number of sub-lines.

INDUSTRIAL APPLICABILITY

The present invention is suitable as a cache memory for facilitating high-speed memory access, and is suitable, for example, as an on-chip cache memory, an off-chip cache memory, a data cache memory, an instruction cache memory, and the like.

The invention claimed is:

1. A cache memory, comprising:
an addition unit which adds, to each cache entry holding line data, a caching termination attribute indicating whether or not caching of the cache entry is allowed to be terminated;
a selection unit which selects a cache entry that has been added with a caching termination attribute indicating that caching is allowed to be terminated, and has been set with a dirty flag indicating that the cache entry has been written into; and
a write back unit which writes back, to a memory, line data of the selected cache entry, regardless of an occurrence of a cache miss,
a holding unit which holds an address range specified by a processor, said holding unit being configured as a register that can be accessed by the processor through an instruction;
a search unit which searches for a cache entry holding line data within the address range held in said holding unit; and
a setting unit which sets, to the searched-out cache entry, the caching termination attribute indicating that caching is allowed to be terminated, while said cache memory is not being accessed by the processor;
wherein storing of the address range in said holding unit is performed according to a data transfer instruction for transferring data to said holding unit.

2. The cache memory according to claim 1, wherein said search unit includes:
a first conversion unit which, in the case where a start address of the address range held in said holding unit indicates a point midway through line data, converts the start address into a start line address indicating a start line included in the address range;
a second conversion unit which, in the case where an end address of the address range held in said holding unit indicates a point midway through line data, converts the end address into an end line address indicating an end line included in the address range; and
a judgment unit which judges whether or not there exist cache entries holding data corresponding to respective line addresses from the start line address to the end line address.

3. The cache memory according to claim 1, further comprising:
a replacement unit which, when a cache miss occurs, selects, as a subject for replacement, the cache entry that has been added with the caching termination attribute indicating that caching is allowed to be terminated.

4. The cache memory according to claim 1,
wherein said addition unit includes:
an instruction detection unit which detects execution, by a processor, of a store instruction having, as instruction details, addition of the caching termination attribute indicating that caching is allowed to be terminated, and writing of data; and a setting unit which sets the caching termination attribute to a cache entry that has been written into in accordance with the detected instruction.

5. The cache memory according to claim 1,
wherein said write back unit writes back data of a cache entry to the memory, when a memory bus has an idle cycle.

6. The cache memory according to claim 1,
wherein each cache entry has a dirty flag for each of a plurality of sub-lines making up one line, and
said write back unit writes back, to the memory, only a dirty sub-line of the cache entry selected by said selection unit.

7. A control method for use in a cache memory, comprising:
storing an address range into a specified register through execution of a data transfer instruction by a processor;
searching for a cache entry holding line data within the address range stored in the register;
adding, to each of the searched cache entries holding line data, a caching termination attribute indicating whether or not caching of the cache entry is allowed to be terminated, while the cache memory is not being accessed by the processor;
selecting a cache entry that has been added with a caching termination attribute indicating that caching is allowed to be terminated, and has been set with a dirty flag indicating that the cache entry has been written into; and
writing back, to a memory, line data of the selected cache entry, regardless of an occurrence of a cache miss.

8. The cache memory according to claim 1,
wherein said addition unit comprises a command holding unit which holds, as a command, a cache memory operation performed by said addition unit, said command holding unit being configured of a register accessed by the processor through an instruction, and
said setting unit sets the caching termination attribute indicating that caching is allowed to be terminated, while said cache memory is not being accessed by the processor, when a command for setting the caching termination attribute is stored in said command holding unit.

* * * * *